US012795554B2

(12) United States Patent
Yin et al.

(10) Patent No.: US 12,795,554 B2
(45) Date of Patent: Nov. 10, 2026

(54) TRANSMISSION POWER MANAGEMENT IN NON-TERRESTRIAL NETWORKS

(71) Applicant: ZTE Corporation, Shenzhen (CN)

(72) Inventors: Yachao Yin, Shenzhen (CN); Nan Zhang, Shenzhen (CN); Wei Cao, Shenzhen (CN); Fangyu Cui, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 330 days.

(21) Appl. No.: 18/618,578

(22) Filed: Mar. 27, 2024

(65) Prior Publication Data

US 2024/0267853 A1 Aug. 8, 2024

Related U.S. Application Data

(63) Continuation of application No. PCT/CN2022/075830, filed on Feb. 10, 2022.

(51) Int. Cl.

| | |
|---|---|
| ***H04W 52/28*** | (2009.01) |
| ***H04W 52/14*** | (2009.01) |
| ***H04W 52/36*** | (2009.01) |
| ***H04W 84/06*** | (2009.01) |

(52) U.S. Cl.

CPC ....... *H04W 52/283* (2013.01); *H04W 52/146* (2013.01); *H04W 52/367* (2013.01); *H04W 84/06* (2013.01)

(58) Field of Classification Search

CPC ............. H04W 52/283; H04W 52/146; H04W 52/367; H04W 84/06

USPC .......................................................... 455/522

See application file for complete search history.

(56) References Cited

U.S. PATENT DOCUMENTS

| | | | | |
|---|---|---|---|---|
| 2014/0378127 A1* | 12/2014 | Garnett | H04W 28/0215 | 455/552.1 |
| 2020/0383067 A1* | 12/2020 | Liu | H04W 52/367 | |
| 2021/0144652 A1 | 5/2021 | Gheorghiu et al. | | |
| 2021/0176793 A1 | 6/2021 | Abedini et al. | | |
| 2023/0082416 A1* | 3/2023 | Tuck | H04W 52/283 | 455/456.1 |

FOREIGN PATENT DOCUMENTS

| | | |
|---|---|---|
| CN | 105393604 A | 3/2016 |
| WO | WO-2018/045747 A1 | 3/2018 |
| WO | WO-2020/204421 A1 | 10/2020 |

OTHER PUBLICATIONS

Communication pursuant to Article 94(3) EPC for EP Appl. No. 22925328.1, dated Dec. 1, 2025 (8 pages).

(Continued)

*Primary Examiner* — Eugene Yun

(74) *Attorney, Agent, or Firm* — Foley & Lardner LLP

(57) ABSTRACT

Systems and methods for wireless communications are disclosed herein. In some arrangements, a network receives from a wireless communication device a location and capability of the wireless communication device. The network determines power parameters for the wireless communication device. Each of the plurality of power parameters is mapped to a corresponding one of a plurality of geometric parameters. The network sends to the wireless communication device the power parameters.

20 Claims, 8 Drawing Sheets

(56) References Cited

OTHER PUBLICATIONS

International Search Report and Written Opinion for PCT Appl. No. PCT/CN2022/075830, mailed Jul. 1, 2022 (9 pages).
Extended European Search Report for EP Appl. No. 22925328.1, dated Oct. 25, 2024 (11 pages).
Sony, "Discussion on physical layer control procedures", 3GPP TSG RAN WG1 #97, R1-1906829, May 17, 2019, Reno, USA (4 pages).

* cited by examiner

500

| Elevation Angle Ranges (Degrees) | [10,23.5) | [23.5,39.5) | [39.5,72) | [72,90] |
|---|---|---|---|---|
| Power Class | 1 | 1.5 | 2 | 3 |

800

| Elevation Angle Ranges (Degrees) | [10.5,17.5) | [17.5,25.5) | [25.5,36) | [36,50.5) | [50.5,90] |
|---|---|---|---|---|---|
| Output Power Levels (dBm) | 31 | 29 | 27 | 25 | 23 |

TRANSMISSION POWER MANAGEMENT IN NON-TERRESTRIAL NETWORKS

CROSS-REFERENCE TO RELATED APPLICATION

This application claims the benefit of priority under 35 U.S.C. § 120 as a continuation of International Patent Application No. PCT/CN2022/075830, filed on Feb. 10, 2022, the disclosure of which is incorporated herein by reference in its entirety.

TECHNICAL FIELD

The present disclosure relates to the field of telecommunications, and in particular, to transmission power management in non-terrestrial networks (NTNs).

BACKGROUND

In New Radio (NR) over NTNs, a User Equipment (UE) may always utilize the maximum output power (e.g., 23 dBm) of a power class specified in the standard for uplink transmissions for all bands within FR1. In the example in which the UE is a smart phone, due to serious loss of the actual terminal antenna and long-distance channel, the uplink coverage is limited. The normal operation of uplink services cannot be guaranteed by conventional methods. In the examples in which the UE is capable of higher maximum output power with different power classes, the coverage gap can be resolved by adopting the higher maximum output power for another power class.

SUMMARY

The example arrangements disclosed herein are directed to solving the issues relating to one or more of the problems presented in the prior art, as well as providing additional features that will become readily apparent by reference to the following detailed description when taken in conjunction with the accompany drawings. In accordance with various arrangements, example systems, methods, devices and computer program products are disclosed herein. It is understood, however, that these arrangements are presented by way of example and are not limiting, and it will be apparent to those of ordinary skill in the art who read the present disclosure that various modifications to the disclosed arrangements can be made while remaining within the scope of this disclosure.

In some arrangements, a wireless communication method includes receiving, by a network from a wireless communication device, a location and capability of the wireless communication device, determining, by the network, a plurality of power parameters for the wireless communication device, wherein each of the plurality of power parameters is mapped to a corresponding one of a plurality of geometric parameters; and sending, by the network to the wireless communication device, the plurality of power parameters.

In some arrangements, a wireless communication method includes reporting, by a wireless communication device to a network, a location and capability of the wireless communication device, determining a plurality of power parameters by one of: receiving, by the wireless communication device from the network, the plurality of power parameters and a plurality of geometric parameters mapped to the plurality of power parameters or determining, by the wireless communication device, the plurality of power parameters based on the location of the wireless communication device and a path of a base station of the network, and transmitting, by the wireless communication device to the network, uplink data using the plurality of power parameters.

In some arrangements, a wireless communication method includes determining, by the wireless communication device, at least one of an elevation angle, a distance, or a sub-zone of cell for the wireless communication device based on a location of the wireless communication device and a path of a base station of the network, determining, by the wireless communication device, a first maximum output power based on a mapping between a plurality of power classes and a plurality of geometric parameters, and transmitting, by the wireless communication device to the network, first uplink data based on the first maximum output power.

The above and other aspects and their implementations are described in greater detail in the drawings, the descriptions, and the claims.

BRIEF DESCRIPTION OF THE DRAWINGS

Various example arrangements of the present solution are described in detail below with reference to the following figures or drawings. The drawings are provided for purposes of illustration only and merely depict example arrangements of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

Various example arrangements of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example arrangements and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

As used herein, examples of a base station of a network (e.g., an NTN) include a satellites, a High Altitude Platform Station (HAPS) (e.g., balloons, Unmanned Aerial Vehicles (UAVs), other suitable airborne vehicles, etc.), and so on. The satellite can be in Low Earth Orbit (LEO) or High Earth Orbit (HEO). A UE requires higher uplink transmission power when communicating with a base station in HEO and requires lower uplink transmission power when communicating with a base station in LEO, HAPS, or terrestrial base station. In addition, the coverage gap of an LEO base station for a UE in different elevation angles may be significant such that power requirements may vary considerably. To address such issues, the arrangements of the present disclosure relates to flexibly and dynamically controlling and adjusting transmission power. Flexible power class switching can ensure the service quality for different satellite types and traffic services via selection of a power class. In that regard, for a UE that is capable of transmitting using different power classes, flexible uplink power control, reliable uplink coverage, and energy saving can be achieved for NTN.

Figure 1:
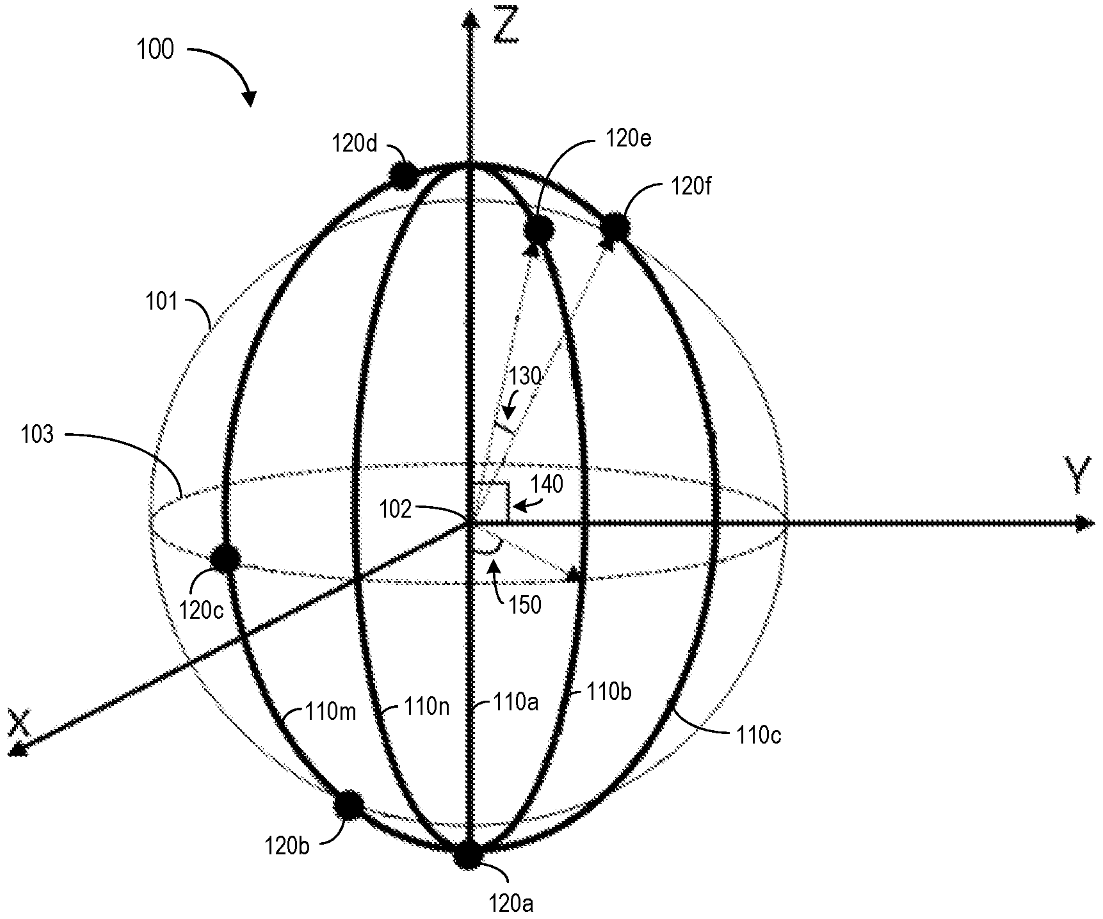
FIG. 1 is a schematic diagram illustrating an NTN, in accordance with some arrangements of the present disclosure.

FIG. 1 is a schematic diagram illustrating a satellite ephemeris in an NTN 100, in accordance with some arrangements of the present disclosure. The satellite ephemeris includes parameters (e.g., orbital-level parameters) that provide information relating to multiple pre-determined paths (e.g., N orbits 110*a*, 110*b*, 110*c*, . . . , 110*m*, and 110*n*) of multiple satellites 120*a*-120*f* (e.g., multiple first communication nodes) orbiting the Earth 101, which has a center 102 (e.g., the center of mass of the Earth 101) and an equatorial plane 103. Each of the orbits 110*a*, 110*b*, 110*c*, . . . , 110*m*, and 110*n* has a corresponding orbit plane. In particular, the orbital-level parameters include but are not limited to, a number of orbits (e.g., N), a number of satellites (e.g., the satellites 120*a*, 120*b*, 120*c*, and 120*d*) in a single orbit plane (e.g., the orbit plane corresponding to the orbit 110*m*), an inter-orbit plane satellite phasing angle (e.g., the inter-orbit plane satellite phasing angle 130 between the satellite 120*e* of the orbit 110*b* and the satellite 120*f* of the orbit 110*c*), an orbital plane inclination (e.g., an orbital plane inclination 240), a longitude difference between Right Ascension of the Ascending Node (RAAN) of adjacent orbital planes (e.g., a longitude difference between RAAN of adjacent orbital planes 250), and so on.

In some implementations, for an NTN such as the NTN 100, the uplink power control schemes (e.g., in NR Release-15) allows uplink transmission power used by the UE to be calculated using the following expression:

$$P = \min[P_{CMAX}, \{P_O(j) + \alpha(k)\cdot PL(q) + f(l) + 10\lg M + \Delta\}], \quad (1)$$

where $P_{CMAX}$ is the allowed maximum output power of a power class, P is the targeted power, α is the path loss compensation factor, PL is the estimated uplink path loss, M is the bandwidth, f(l) is the power control adjustment state, and Δ is the Modulation and Coding Scheme (MCS) delta.

For a UE that is capable of different power classes, the procedure for determining a power class can be implemented by the UE to switch power classes. The UE supports a power class (or at least one power class, referred to herein as a supported power class) different from a default UE power class for a band, where that supported power class enables a maximum output power larger than the maximum output power of the default power class. A UE that is capable of different power classes can achieve a higher maximum output power through the supported power class and corresponding duty cycle of actual transmission time as compared to the default power class.

For example, the UE applies all requirements for the default power class to the supported power class and sets the configured transmitted power if 1) the UE capability field maxUplinkDutyCycle-PC2-FR1 is absent and the percentage of uplink symbols transmitted in a certain evaluation period is larger than 50% (e.g., the exact evaluation period is no less than one radio frame); 2) if the field of UE capability maxUplinkDutyCycle-PC2-FR1 is not absent and the percentage of uplink symbols transmitted in a certain evaluation period is larger than maxUplinkDutyCycle-PC2-FR1 (e.g., the exact evaluation period is no less than one radio frame); or 3) if the Information Element (IE) P-Max is provided and set to the maximum output power of the default power class or lower.

The UE applies all requirements for power class 2 to the supported power class and set the configured transmitted power 1) if the UE does not support a power class with a higher maximum output power than PC2; 2) if the UE capability field maxUplinkDutyCycle is absent and the percentage of uplink symbols transmitted in a certain evaluation period is larger than 25% (e.g., the exact evaluation period is no less than one radio frame); 3) if the UE capability field maxUplinkDutyCycle is not absent and the percentage of uplink symbols transmitted in a certain evaluation period is larger than maxUplinkDutyCycle/2 (e.g., the exact evaluation period is no less than one radio frame); or 4) if the IE P-Max is provided and set to the maximum output power of the power class 2 or lower. Otherwise, the UE applies all requirements for the supported power class and set the configured transmitted power class.

Figure 2:
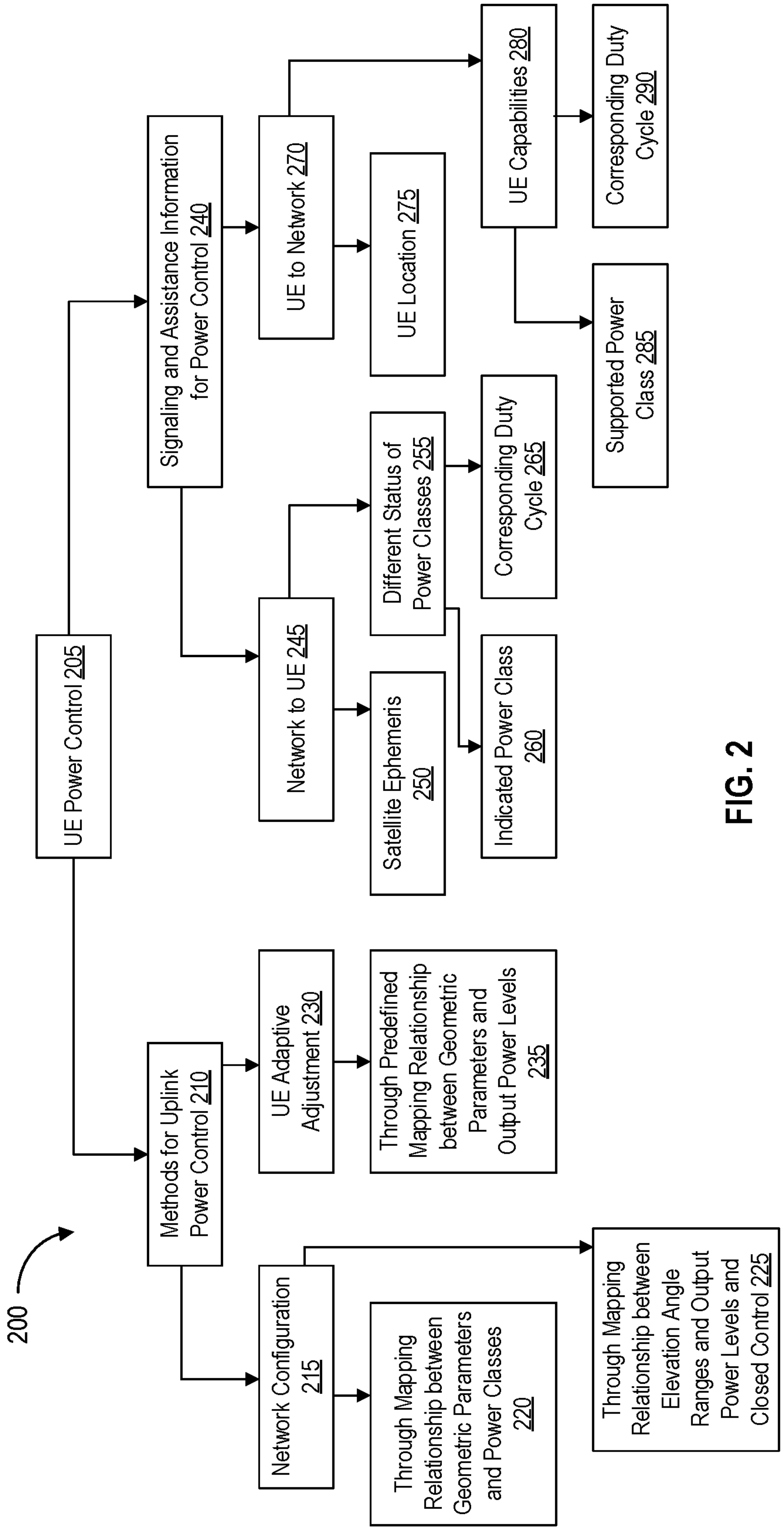
FIG. 2 is a diagram illustrating methods for controlling uplink transmission power of a UE, according to various arrangements.

FIG. 2 is a diagram illustrating methods for controlling uplink transmission power of a UE, according to various arrangements. Referring to FIGS. 1 and 2, UE power control (205) includes various methods for uplink power control (210) which allow for flexible uplink power control (e.g., in NR) in a NTN (e.g., the NTN 100) by adjusting the maximum output power of a power class. Two such methods can be used—power control via network configuration (215) and power control via UE adaptive adjustment (230).

With respect to network configuration (215), a base station (e.g., a gNB) calculates the UE's geometric parameters based on the information of reported UE location and satellite ephemeris. Examples of geometric parameters include an elevation angle (e.g., elevation angle ranges or elevation angle thresholds), a distance (e.g., distance ranges or distance thresholds), a sub-zone of cell (e.g., sub-zone ranges or sub-zone thresholds), and so on. The base station configures different status of power classes for the UE within different specific periods through a mapping relationship between geometric parameters and power classes (220). The base station can configure different status of power classes for the UE within specific periods through a mapping relationship between geometric parameters and output power levels, and closed control (225).

With respect to UE adaptive adjustment 230, UE calculates its own geometric parameters based on the information of its location obtained by Global Navigation Satellite System (GNSS) and satellite ephemeris and applies the maximum output power of a supported power class through predefined mapping relationship between geometric parameters and power classes (235).

The methods for uplink power control 210 are supported by signaling and assistance information for power control (240), which includes in general network-to-UE communications (245) and/or UE-to-network communications (270). The network-to-UE communications (245) include a base station sending the satellite ephemeris (250) and different status of power classes (255) to the UE. The different status of power classes (255) includes indicated power class(es) (260) and duty cycle(s) (265) corresponding to the indicated power class(es). The UE-to-network communications (270) include UE location (275) and UE capabilities (280). The UE capabilities (280) may include supported power class(es) (285) and duty cycle(s) (290) corresponding to the reported power class(es).

Figure 3:
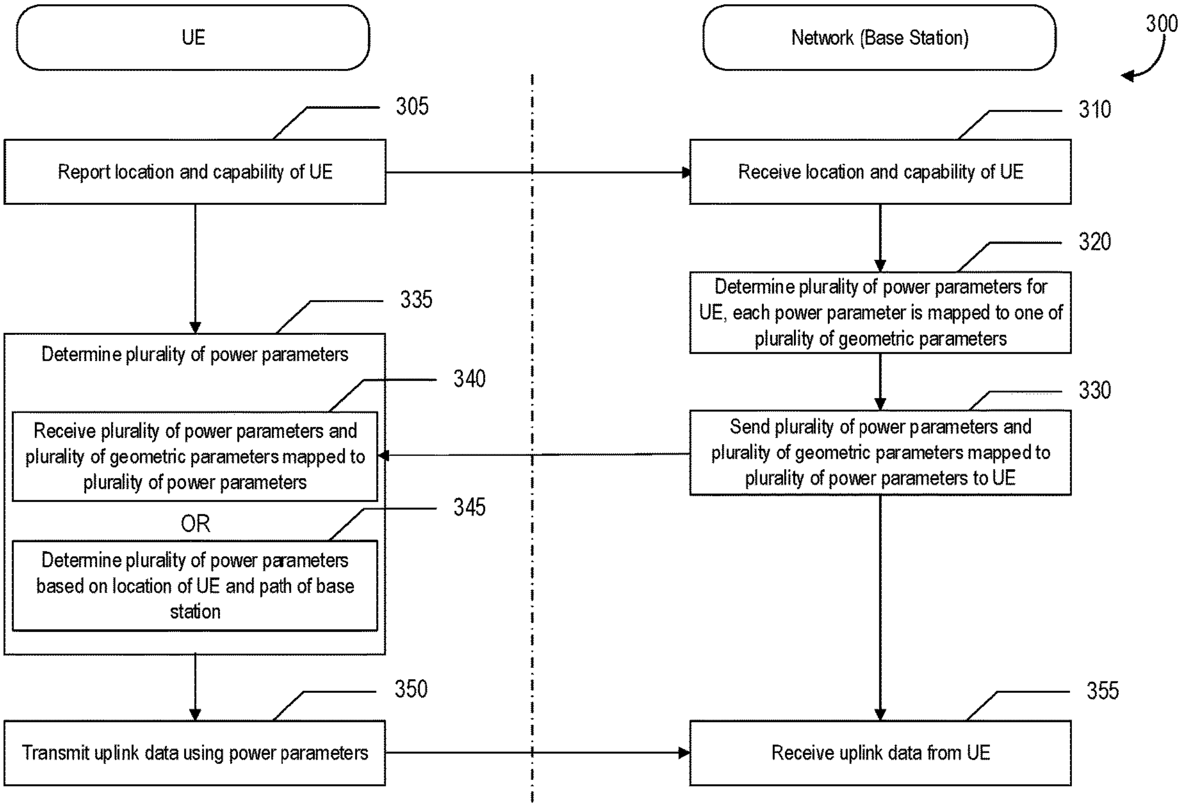
FIG. 3 is a flowchart diagram illustrating an example method for controlling uplink transmission power of a UE, according to various arrangements.

FIG. 3 is a flowchart diagram illustrating an example method 300 for controlling uplink transmission power of a UE, according to various arrangements. Referring to FIGS. 1-3, the method 300 can be performed by a UE and the network (e.g., a base station of the network). An example of the network is the NTN 100. The base station of the network may be a satellite (e.g., in HEO and/or LEO). Blocks 305, 335 (including 340 and 345), and 350 are performed by the UE. Blocks 310, 320, 330, and 355 are performed by the network (e.g., the base station).

At 305, the UE reports a location of the UE and the capability of the UE. In some examples, the capability of the UE includes at least one of all supported power classes (e.g., all power classes that the UE can support), supported maximum output power levels (e.g., the maximum output power levels that the UE can support), or supported duty cycles (e.g., the duty cycles that the UE can support). At 310, the network receives from the UE the location of the UE and the capability of the UE.

At 335, the UE determines a plurality of power parameters. The plurality of power parameters includes at least one of a power class, maximum output power level, or duty cycle.

In some arrangements, the UE determines the plurality of power parameters by receiving, from the network, the plurality of power parameters and a plurality of geometric parameters mapped to the plurality of power parameters, at 340. In such arrangements, at 320 the network determines a plurality of power parameters for the UE. In some examples, each of the plurality of power parameters is mapped to a corresponding one of a plurality of geometric parameters. The plurality of geometric parameters includes at least one of an elevation angle (e.g., elevation angle ranges or elevation angle thresholds), a distance (e.g., distance ranges or distance thresholds), and a sub-zone of cell (e.g., sub-zone ranges or sub-zone thresholds).

At 330, in some arrangements, the network sends the plurality of power parameters and the plurality of geometric parameters mapped to the plurality of power parameters to the UE, and at 340, the UE receives the plurality of power parameters and the plurality of geometric parameters mapped to the plurality of power parameters.

As an alternative to blocks 320, 330, and 340, the UE itself determines the plurality of power parameters based on the location of the UE and a path of the base station of the network, at 345.

At 350, the UE transmits uplink data using the plurality of power parameters. At 355, the network receives the uplink data from the UE.

Figures 4, 5:
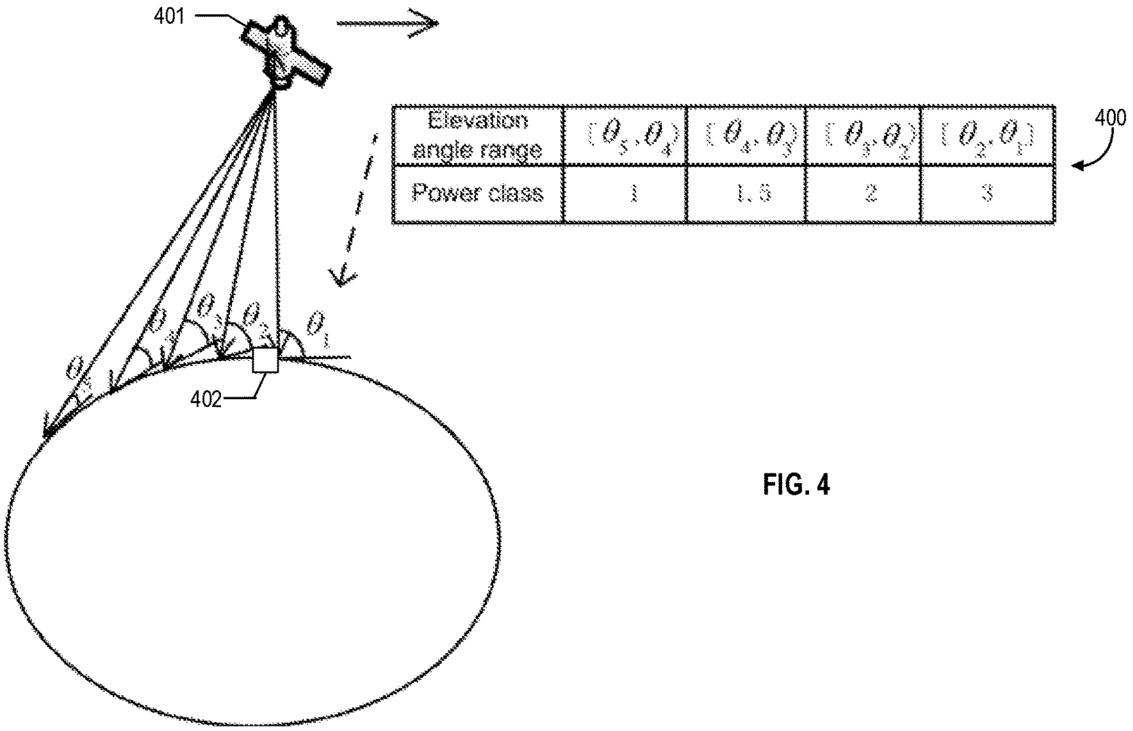
FIG. 4 is a diagram illustrating a mapping relationship between elevation angles and power classes, according to various arrangements.
FIG. 5 is a diagram illustrating a mapping relationship between elevation angles and power classes, according to various arrangements.

FIG. 4 is a diagram illustrating a mapping relationship 400 between elevation angles and power classes, according to various arrangements. Referring to FIGS. 1-4, the mapping relationship 400 is for the position of the base station 401 (e.g., a LEO satellite) relative to the position of the UE 402. The base station 401 may be traveling at an altitude of 600 km from the UE 402 (e.g., LEO-600 km scenario). As the base station 401 travels, the elevation angle for the UE 402 relative to the base station 401 can be at $\theta_1$, $\theta_2$, $\theta_3$, $\theta_4$, $\theta_5$, and so on at various points in time.

It may be difficult for the UE to support uplink coverage when the UE 402 is at a lower elevation angle (e.g., $\theta_5$) due to serious loss, as the distance between the UE 402 and the base station 401 is considerably longer at lower elevation angle (e.g., $\theta_5$) than at higher elevation angle (e.g., $\theta_1$). In the example in which the UE 402 has the capability of supporting different power classes (classes in addition to the default power class), a higher maximum output power enables reliable uplink coverage. That is, the coverage gap at different elevation angle ranges can be compensated by the supported power classes.

As shown, the mapping relationship 400 maps different elevation angle ranges to different power classes. Based on the current elevation angle, the UE 402 or the base station 401 can determine the appropriate power class for uplink transmissions. As shown, the mapping relationship 400 defines that power class 1 is mapped to the range $[\theta_5, \theta_4)$, power class 1.5 is mapped to the range $[\theta_4, \theta_3)$, power class 2 is mapped to the range $[\theta_3, \theta_2)$, and power class 3 is mapped to the range $[\theta_2, \theta_1)$.

FIG. 5 is a diagram illustrating a mapping relationship 500 between elevation angles and power classes, according to various arrangements. The mapping relationship 500 is a specific example of the mapping relationship 400, in some examples. As shown, the mapping relationship 500 defines that power class 1 is mapped to the range [10.5, 23.5), power class 1.5 is mapped to the range [23.5, 39.5), power class 2 is mapped to the range [39.5, 72), and power class 3 is mapped to the range [72, 90). Similar mapping relationship 800 can be likewise implemented for other geometric parameters, such as a distance (e.g., distance ranges or distance thresholds), and a sub-zone of cell (e.g., sub-zone ranges or sub-zone thresholds).

Figure 6:
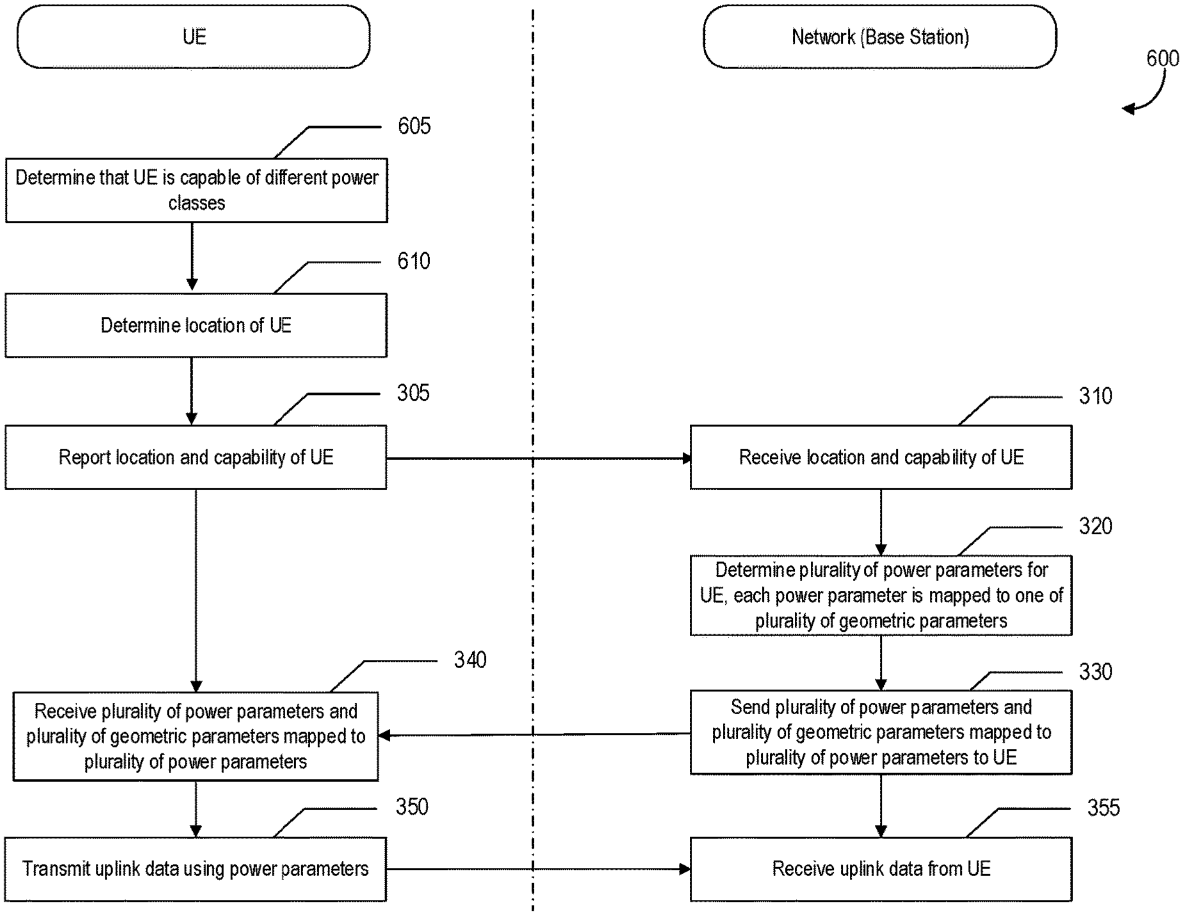
FIG. 6 is a flowchart diagram illustrating an example method for controlling uplink transmission power of a UE, according to various arrangements.

FIG. 6 is a flowchart diagram illustrating an example method 600 for controlling uplink transmission power of a UE, according to various arrangements. Referring to FIGS. 1-6, the method 600 is a particular implementation of the method 300. The method 600 can be performed by a UE and the network (e.g., a base station of the network). An example of the network is the NTN 100. The base station of the network may be a satellite (e.g., in HEO and/or LEO). Blocks 605, 610, 305, 340, and 350 are performed by the UE. Blocks 310, 320, 330, and 355 are performed by the network (e.g., the base station).

At 605, the UE determines whether the UE is capable of supporting different power classes. That is, the UE determines whether the UE can use transmission powers in different power classes (e.g., one or more power classes in addition to the default power class).

At 610, the UE determines the its location. For example, the UE can determine its location via GNSS. At 305, the UE reports the location and the capability of multiple power classes of the UE to the network as described. In some arrangements, block 305 includes reporting duty cycles corresponding to the power classes to the network. In some examples, the UE reports the location and the capability of multiple power classes of the UE to the network via suitable uplink channel (e.g., Physical Uplink Control Channel (PUCCH)). At 310, the network receives the location and the capability of the UE as described. For example, the network receives from the UE an indication that the UE is capable of transmitting uplink signals using different power classes and corresponding duty cycles.

At 320, the network (e.g., the base station) determines a plurality of power parameters for the UE, where each power parameter is mapped to one of the plurality of geometric parameters, as described.

In some arrangements, this includes first determining, by the network, the geometric parameters relative to the UE (e.g., concerning to the relative position of the UE and the base station) based on the location of the UE and a path of a base station. The plurality of geometric parameters includes at least one of an elevation angle (e.g., elevation angle ranges or elevation angle thresholds), a distance (e.g., distance ranges or distance thresholds), and a sub-zone of cell (e.g., sub-zone ranges or sub-zone thresholds). The path of the base station includes the ephemeris of the base station which may be a satellite. The path may also include other suitable paths (e.g., a flight path) in the examples in which the base station is a HAPS or UAV.

After the geometric parameters are determined, the base station can determine the power parameters (e.g., status of power classes and corresponding duty cycles) by based on the mapping between the power parameters and the geometric parameters. For example, in response to determining that a determined geometric parameter is within a geometric parameter range or crosses a geometric parameter threshold, a power parameter corresponding to the geometric parameter range or the geometric parameter threshold is selected.

In the mapping relationship 500, for example, in response to determining that the elevation angle between the UE and the base station is 23 degrees, power class 1 is selected. In response to determining that the elevation angle between the UE and the base station becomes 24 degrees, power class 1.5 is selected, which will trigger the UE to switch its power class.

The base station can send the power parameters and the plurality of geometric parameters mapped to the power parameters to the UE, at 330. Blocks 330, 340, 350, and 360 in FIG. 6 are similar to blocks 330, 340, 350, and 360 in FIG. 3.

In some examples, transmitting the uplink data using the power parameters at 350 includes applying the maximum output power of supported power class (received as a power parameter at 340) through Downlink Control Information (DCI). For example, UE applies maximum output power of power class 1 and corresponding duty cycle of 10% in a duration (e.g., a specific time period) in which the UE and the base station are at elevation angles from 10 degrees to 23.5 degrees. Then, the UE adopts the maximum output power of power class 1.5 and corresponding duty cycle of 25% in a duration (e.g., another specific time period) in which the UE and the base station are at elevation angles from 23.5 degrees to 39.5 degrees.

Figure 7:
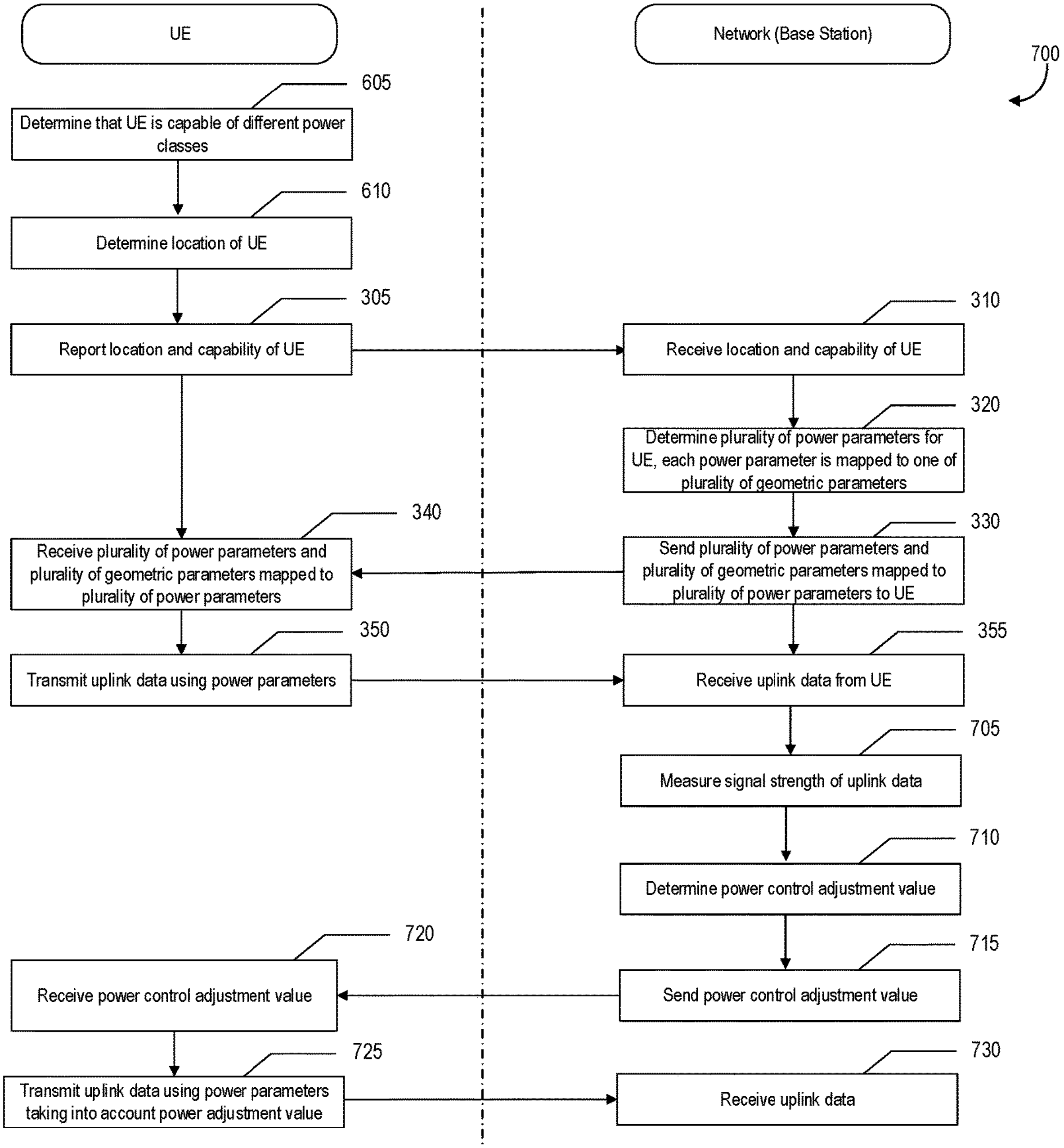
FIG. 7 is a flowchart diagram illustrating an example method for controlling uplink transmission power of a UE, according to various arrangements.

FIG. 7 is a flowchart diagram illustrating an example method 700 for controlling uplink transmission power of a UE, according to various arrangements. Referring to FIGS. 1-7, the method 700 is a particular implementation of the method 300. The method 700 can be performed by a UE and the network (e.g., a base station of the network). An example of the network is the NTN 100. The base station of the network may be a satellite (e.g., in HEO and/or LEO). Blocks 605, 610, 305, 340, 350, 720, and 725 are performed by the UE. Blocks 310, 320, 330, 355, 705, 710, and 715 are performed by the network (e.g., the base station). Blocks 605, 610, 305, 310, 320, 330, 340, 350, and 355 are similar to those described with respect to FIG. 6.

In some arrangements, the capability of the UE (reported at 305 to the network, which receives the same at 310) includes an indication of a maximum output power level and a corresponding duty cycle.

In some arrangements, the power parameters includes different status of output power level (instead of power class) and corresponding duty cycles. That is, the different status of output power level (instead of power class) and corresponding duty cycles are determined at 320 and sent to the UE at 330. The determined or configured output power level is less than the reported output power level reported by the UE at 305.

Figures 8, 9:
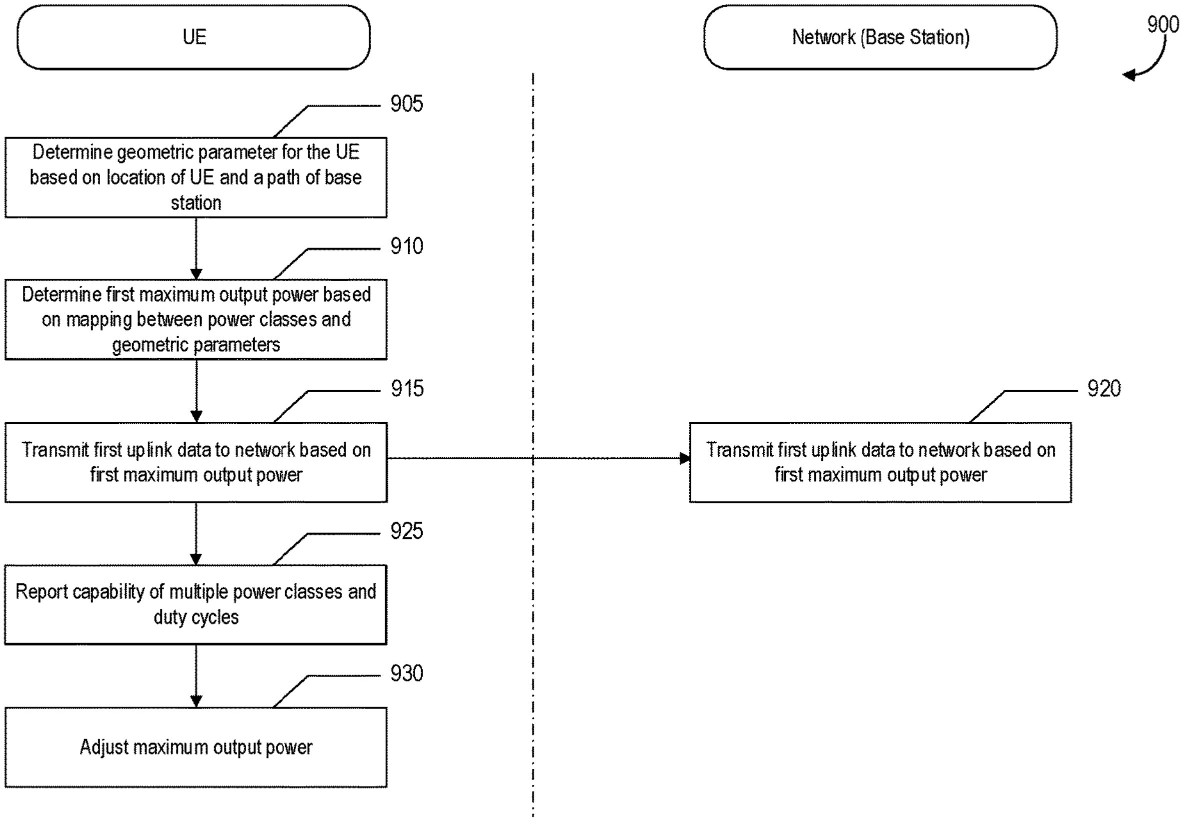
FIG. 8 is a diagram illustrating a mapping relationship between elevation angles and power output levels (in dBm), according to various arrangements.
FIG. 9 is a flowchart diagram illustrating an example method for controlling uplink transmission power of a UE, according to various arrangements.

FIG. 8 is a diagram illustrating a mapping relationship 800 between elevation angles and power output levels (in dBm), according to various arrangements. As shown, the mapping relationship 800 defines that output power level 31 dBm is mapped to the range [10.5, 17.5), output power level 29 dBm is mapped to the range [17.5, 25.5), output power level 27 dBm is mapped to the range [25.5, 36), output power level 25 dBm is mapped to the range [36, 50.5), and output power level 23 dBm is mapped to the range [50.5, 90). In the mapping relationship 800, the output power levels are mapped to the different elevation angle ranges at a step of a number (e.g., 2) of dBm. Similar mapping relationship 800 can be likewise implemented for other geometric parameters, such as a distance (e.g., distance ranges or distance thresholds), and a sub-zone of cell (e.g., sub-zone ranges or sub-zone thresholds).

At 350, the UE transmits the uplink data (e.g., first uplink transmission) to the network using the power parameters (e.g., first power parameters) received at 340. The network receives the first uplink transmission at 355. The UE can apply the output power level through DCI. For example, UE applies output power level of 31 dBm and corresponding duty cycle of 10% at elevation angle range from 10.5 degree to 17.5 degree for initial transmission according to the mapping relationship 800.

At 705, the network (e.g., the base station) measures the signal strength (e.g., uplink Reference Signal (UP RS) for the first uplink transmission. At 710, the network (e.g., the base station) determines a power control adjustment value based on measurements of the first uplink transmission. For example, in response to determining that the signal strength of the first uplink transmission is low (e.g., lower than a threshold), the network can increase the previously configured output power level by indicating to the UE to add the power control adjustment value to the previously configured output power level. On the other hand, in response to determining that the signal strength of the first uplink transmission is high (e.g., higher than a threshold), the network can decrease the previously configured output power level by indicating to the UE to subtract the power control adjustment value from the previously configured output power level. At 715, the power control adjustment value is transmitted to the UE (e.g., through a Transmit Power Control (TPC) command via DCI), which receives the same at 720.

At 725, the UE transmits uplink data (e.g., second uplink transmission) using another power parameter, which is an updated output power level adjusted using the power control adjustment value. For example, the previously used output power level (e.g., used at block 250) is modified within a threshold (e.g., below the maximum supported output power level of the UE). The network receives the second uplink transmission at 730.

FIG. 9 is a flowchart diagram illustrating an example method 900 for controlling uplink transmission power of a UE, according to various arrangements. Referring to FIGS. 1-9, the method 900 can be performed by a UE and the network (e.g., a base station of the network). An example of the network is the NTN 100. The base station of the network may be a satellite (e.g., in HEO and/or LEO). Blocks 905, 910, and 915 are performed by the UE. Block 920 is performed by the network (e.g., the base station). The method 900 relates to the UE adjusting the output power in real time through the predefined mapping relationship between elevation angle range and power class.

At 910, the UE determines at least one geometric parameter (e.g., one or more of an elevation angle, a distance, or a sub-zone of cell) for the UE based on a location of the UE and a path of a base station of the network. In some implementations, before block 910, the UE determines that it is capable of different power classes at 605 and determines its location at 610. Based on the UE's location, the UE can determine the least one geometric parameter based on relative position between the UE and the base station, where the position of the base station can be determined using the satellite ephemeris.

At 910, the UE determines a first maximum output power based on a mapping between a plurality of power classes and a plurality of geometric parameters. In other words, at 910, the UE determines the power parameters (rather than the network determining the power parameters at 320). The algorithms and mechanisms for calculating the power parameters are the same.

For example, the UE can set the maximum output power of supported power class according to the mapping relationship between elevation angle range and optimal power class as defined in the mapping relationship 500. The UE can compare the elevation angle with a set of elevation angle ranges or distance thresholds. For example, UE applies maximum output power of power class 1 and corresponding duty cycle of 10% in a duration (e.g., a specific time period) in which the UE and the base station are at elevation angles from 10 degrees to 23.5 degrees.

At 915, the UE transmits to the network a first uplink data based on the first maximum output power, which the network receives at 920. For example, the UE applies the first maximum output power when transmitting the first uplink data.

At 925, the UE can report, through PUCCH, its capability of multiple power classes and corresponding duty cycles for the base station within specific periods. In other words, the UE reports to the network an indication that the UE is capable of transmitting uplink signals using different power classes and duty cycles corresponding to the power classes.

At 930, the UE can adjust the maximum output power. In some arrangements, the UE determines at least one of an updated elevation angle, an updated distance, or an updated sub-zone of cell for the UE based on an updated location of the UE and the path of the base station of the network. The UE determines a second maximum output power based on the mapping between the plurality of power classes and the plurality of geometric parameters (e.g., the relationship mapping 500). The UE can send and the network can receive second uplink data based on the second maximum output power.

For example, the UE can adjust the first maximum output power and corresponding duty cycle in response to determining that the determined geometric parameter (e.g., the elevation angle) is shifted to another geometric parameter range or threshold, such that another power class is selected. For example, then UE adopts the maximum output power of power class 1.5 and corresponding duty cycle of 25% from elevation angle of 23.5 degree to 39.5 degree.

Figure 10B:
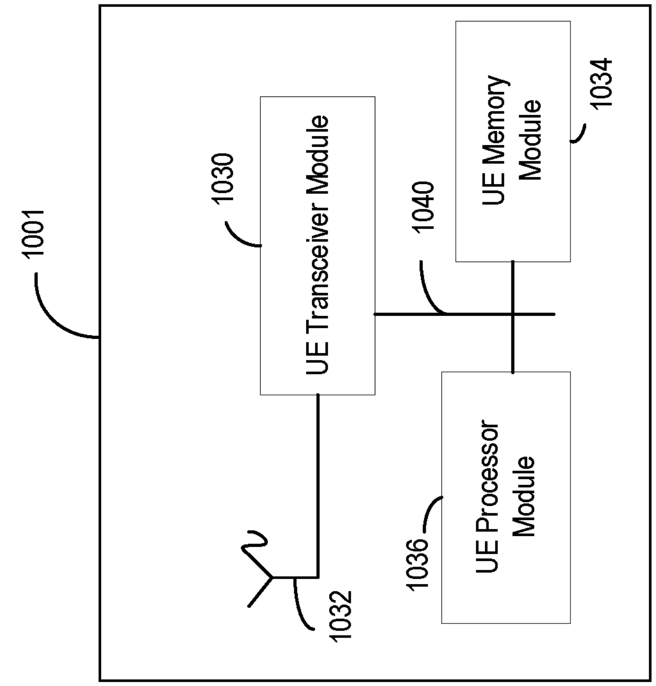
FIG. 10B illustrates a block diagram of an example UE, in accordance with some arrangements of the present disclosure.
Figure 10A:
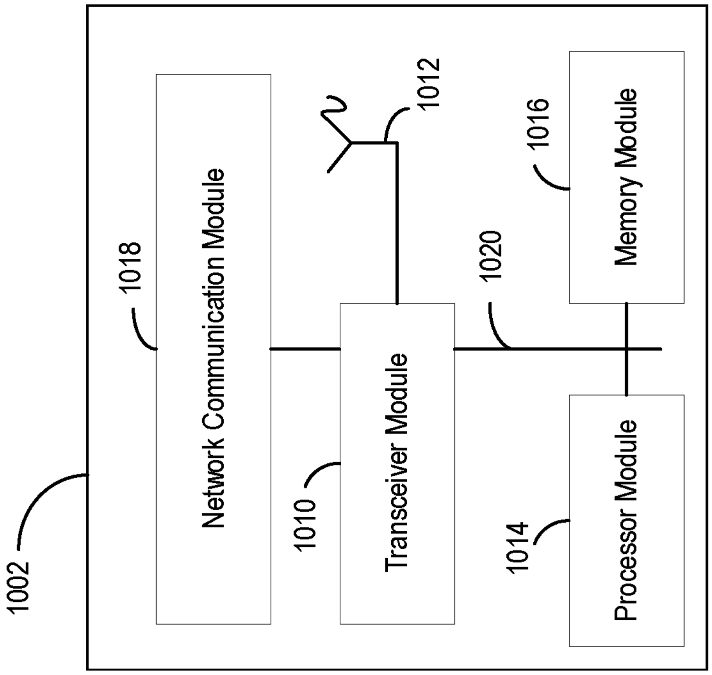
FIG. 10A illustrates a block diagram of an example base station, in accordance with some arrangements of the present disclosure.

The UE may be handling multiple uplink traffic service, such that different service qualities requires different output powers of power classes. Thus, in other arrangements, the UE adjusting the maximum output power at 930 includes adjusting the maximum output power based on the indicated information of high layer for different traffic services. That is, the first uplink data corresponds to a first service. The UE can transmit second uplink data corresponding to a second service using a second maximum output power. For example, UE applies the maximum output of power class 1.5 and corresponding duty cycle of 25% for video service, and adopts the power class 2 and corresponding duty cycle of 50% for VoIP service, and utilizes the default power class for message service;

FIG. 10A illustrates a block diagram of an example base station 1002 (e.g., the first, second, or third communication node), in accordance with some arrangements of the present disclosure. FIG. 10B illustrates a block diagram of an example UE 1001 (e.g., the second communication node), in accordance with some arrangements of the present disclosure. Referring to FIGS. 1-10B, the UE 1001 (e.g., a wireless communication device, a terminal, a mobile device, a mobile user, and so on) is an example implementation of the UEs described herein, and the base station 1002 is an example implementation of the base station described herein.

The base station 1002 and the UE 1001 can include components and elements configured to support known or conventional operating features that need not be described in detail herein. In one illustrative arrangement, the base station 1002 and the UE 1001 can be used to communicate (e.g., transmit and receive) data symbols in a wireless communication environment, as described above. For instance, the base station 1002 can be a base station (e.g., gNB, eNB, and so on), a server, a node, or any suitable computing device used to implement various network functions.

The base station 1002 includes a transceiver module 1010, an antenna 1012, a processor module 1014, a memory module 1016, and a network communication module 1018. The module 1010, 1012, 1014, 1016, and 1018 are operatively coupled to and interconnected with one another via a data communication bus 1020. The UE 1001 includes a UE transceiver module 1030, a UE antenna 1032, a UE memory module 1034, and a UE processor module 1036. The modules 1030, 1032, 1034, and 1036 are operatively coupled to and interconnected with one another via a data communication bus 1040. The base station 1002 communicates with the UE 1001 or another base station via a communication channel, which can be any wireless channel or other medium suitable for transmission of data as described herein.

As would be understood by persons of ordinary skill in the art, the base station 1002 and the UE 1001 can further include any number of modules other than the modules shown in FIGS. 10A and 10B. The various illustrative blocks, modules, circuits, and processing logic described in connection with the arrangements disclosed herein can be implemented in hardware, computer-readable software, firmware, or any practical combination thereof. To illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. The arrangements described herein can be implemented in a suitable manner for each particular application, but any implementation decisions should not be interpreted as limiting the scope of the present disclosure.

In accordance with some arrangements, the UE transceiver 1030 includes a radio frequency (RF) transmitter and a RF receiver each including circuitry that is coupled to the antenna 1032. A duplex switch (not shown) may alternatively couple the RF transmitter or receiver to the antenna in time duplex fashion. Similarly, in accordance with some arrangements, the transceiver 1010 includes an RF transmitter and a RF receiver each having circuitry that is coupled to the antenna 1012 or the antenna of another base station. A duplex switch may alternatively couple the RF transmitter or receiver to the antenna 1012 in time duplex fashion. The operations of the two-transceiver modules 1010 and 1030 can be coordinated in time such that the receiver circuitry is coupled to the antenna 1032 for reception of transmissions over a wireless transmission link at the same time that the transmitter is coupled to the antenna 1012. In some arrangements, there is close time synchronization with a minimal guard time between changes in duplex direction.

The UE transceiver 1030 and the transceiver 1010 are configured to communicate via the wireless data communication link, and cooperate with a suitably configured RF antenna arrangement 1012/1032 that can support a particular wireless communication protocol and modulation scheme. In some illustrative arrangements, the UE transceiver 1010 and the transceiver 1010 are configured to support industry standards such as the Long Term Evolution (LTE) and emerging 5G standards, and the like. It is understood, however, that the present disclosure is not necessarily limited in application to a particular standard and associated protocols. Rather, the UE transceiver 1030 and the base station transceiver 1010 may be configured to support alternate, or additional, wireless data communication protocols, including future standards or variations thereof.

The transceiver 1010 and the transceiver of another base station (such as but not limited to, the transceiver 1010) are configured to communicate via a wireless data communication link, and cooperate with a suitably configured RF antenna arrangement that can support a particular wireless communication protocol and modulation scheme. In some illustrative arrangements, the transceiver 1010 and the transceiver of another base station are configured to support industry standards such as the LTE and emerging 5G standards, and the like. It is understood, however, that the present disclosure is not necessarily limited in application to a particular standard and associated protocols. Rather, the transceiver 1010 and the transceiver of another base station may be configured to support alternate, or additional, wireless data communication protocols, including future standards or variations thereof.

In accordance with various arrangements, the base station 1002 may be a base station such as but not limited to, an eNB, a serving eNB, a target eNB, a femto station, or a pico station, for example. The base station 1002 can be an RN, a regular, a eNB, or a gNB. In some arrangements, the UE 1001 may be embodied in various types of user devices such as a mobile phone, a smart phone, a personal digital assistant (PDA), tablet, laptop computer, wearable computing device, etc. The processor modules 1014 and 1036 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the method or algorithm disclosed herein can be embodied directly in hardware, in firmware, in a software module executed by processor modules 1014 and 1036, respectively, or in any practical combination thereof. The memory modules 1016 and 1034 may be realized as RAM memory, flash memory, ROM memory, EPROM memory, EEPROM memory, registers, a hard disk, a removable disk, a CD-ROM, or any other form of storage medium known in the art. In this regard, memory modules 1016 and 1034 may be coupled to the processor modules 1010 and 1030, respectively, such that the processors modules 1010 and 1030 can read information from, and write information to, memory modules 1016 and 1034, respectively. The memory modules 1016 and 1034 may also be integrated into their respective processor modules 1010 and 1030. In some arrangements, the memory modules 1016 and 1034 may each include a cache memory for storing temporary variables or other intermediate information during execution of instructions to be executed by processor modules 1010 and 1030, respectively. Memory modules 1016 and 1034 may also each include non-volatile memory for storing instructions to be executed by the processor modules 1010 and 1030, respectively.

The network communication module 1018 generally represents the hardware, software, firmware, processing logic, and/or other components of the base station 1002 that enable bi-directional communication between the transceiver 1010 and other network components and communication nodes in communication with the base station 1002. For example, the network communication module 1018 may be configured to support internet or WiMAX traffic. In a deployment, without limitation, the network communication module 1018 provides an 802.3 Ethernet interface such that the transceiver 1010 can communicate with a conventional Ethernet based computer network. In this manner, the network communication module 1018 may include a physical interface for connection to the computer network (e.g., Mobile Switching Center (MSC)). In some arrangements, the network communication module 1018 includes a fiber transport connection configured to connect the base station 1002 to a core network. The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

While various arrangements of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one arrangement can be combined with one or more features of another arrangement described herein. Thus, the breadth and scope of the present disclosure should not be limited by any of the above-described illustrative arrangements.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according arrangements of the present solution.

Additionally, memory or other storage, as well as communication components, may be employed in arrangements of the present solution. It will be appreciated that, for clarity purposes, the above description has described arrangements of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method, comprising:

receiving, by a network from a wireless communication device, a location and capability of the wireless communication device, wherein the capability of the wireless communication device comprises at least one of all supported power classes, supported maximum output power levels, or supported duty cycles;

determining, by the network, a plurality of power parameters for the wireless communication device within the capability of the wireless communication device, wherein each of the plurality of power parameters is determined based on mapping to a corresponding one of a plurality of geometric parameters, wherein the plurality of geometric parameters is determined based at least in part on the location of the wireless communication device, wherein the plurality of power parameters comprises two or more of a power class, maximum output power level, or duty cycle; and sending, by the network to the wireless communication device, the plurality of power parameters, wherein the wireless communication device applies the plurality of power parameters to at least one uplink transmission.

2. The method of claim 1, wherein the plurality of geometric parameters comprises two or more of an elevation angle, a distance, and a sub-zone of a cell.

3. The method of claim 2, wherein the base station comprises a satellite; and the path of the base station comprises an ephemeris of the satellite.

4. The method of claim 1, further comprising determining, by the network, an elevation angle, a distance, or a sub-zone of a cell for the wireless communication device based on the location of the wireless communication device and a path of a base station of the network.

5. The method of claim 1, further comprising receiving, by the network from the wireless communication device, an indication that the wireless communication device is capable of transmitting uplink signals using different power classes and corresponding duty cycle.

6. The method of claim 1, further comprising receiving, by the network from the wireless communication device, an indication of a maximum output power level and corresponding duty cycle.

7. The method of claim 1, further comprising:

receiving, by the network from the wireless communication device, a first uplink transmission sent by the wireless communication device using a first power parameter of the plurality of power parameters;

determining, by the network, a power control adjustment value based on measurements of the first uplink transmission;

sending, by the network to the wireless communication device, the power control adjustment value; and receiving, by the network from the wireless communication device, a second uplink transmission sent by the wireless communication device using a second power parameter, wherein the second power parameter is determined by the wireless communication device based on the power control adjustment value.

8. A network node, comprising:

at least one processor configured to:

receive, via a transceiver from a wireless communication device, a location and capability of the wireless communication device, wherein the capability of the wireless communication device comprises at least one of all supported power classes, supported maximum output power levels, or supported duty cycles;

determine a plurality of power parameters for the wireless communication device within the capability of the wireless communication device, wherein each of the plurality of power parameters is determined based on mapping to a corresponding one of a plurality of geometric parameters, wherein the plurality of geometric parameters is determined based at least in part on the location of the wireless communication device, wherein the plurality of power parameters comprises two or more of a power class, maximum output power level, or duty cycle; and send, via the transceiver to the wireless communication device, the plurality of power parameters, wherein the wireless communication device applies the plurality of power parameters to at least one uplink transmission.

9. The network node of claim 8, wherein the plurality of geometric parameters comprises two or more at least one of an elevation angle, a distance, and a sub-zone of a cell.

10. A method, comprising:

reporting, by a wireless communication device to a network, a location and capability of the wireless communication device, wherein the capability of the wireless communication device comprises at least one of all supported power classes, supported maximum output power levels, or supported duty cycles;

determining a plurality of power parameters within the capability of the wireless communication device by one of:

receiving, by the wireless communication device from the network, the plurality of power parameters and a plurality of geometric parameters determined based on mapping to the plurality of power parameters, wherein the plurality of geometric parameters is determined based at least in part on the location of the wireless communication device, wherein the plurality of power parameters comprises two or more of a power class, maximum output power level, or duty cycle; or determining, by the wireless communication device, the plurality of power parameters based on the location of the wireless communication device and a path of a base station of the network; and transmitting, by the wireless communication device to the network, uplink data using the plurality of power parameters.

11. The method of claim 10, further comprising determining, by the wireless communication device, an elevation angle, a distance, or a sub-zone of cell for the wireless communication device based on the location of the wireless communication device and the path of the base station of the network.

12. The method of claim 11, wherein the location of the wireless communication device is determined based on Global Navigation Satellite System (GNSS).

13. The method of claim 10, wherein the base station comprises a satellite; and the path of the base station comprises an ephemeris of the satellite.

14. The method of claim 10, further comprising receiving, by the wireless communication device from the network, an indication of the applied power class and corresponding duty cycle for the wireless communication device.

15. The method of claim 10, further comprising receiving, by the wireless communication device from the network, an indication of the applied maximum output power level and corresponding duty cycle for the wireless communication device.

16. The method of claim 10, further comprising:

sending, by the wireless communication device to the network, a first uplink transmission using a first power parameter of the plurality of power parameters;

receiving, by the wireless communication device from the network, a power control adjustment value, wherein the power control adjustment value is determined based on measurements of the first uplink transmission; and sending, by the wireless communication device to the network, a second uplink transmission using a second power parameter, wherein the second power parameter is determined by the wireless communication device based on the power control adjustment value.

17. A wireless communication device, comprising:

at least one processor configured to:

report, via a transceiver a to a network, a location and capability of the wireless communication device, wherein the capability of the wireless communication device comprises at least one of all supported power classes, supported maximum output power levels, or supported duty cycles;

determine a plurality of power parameters within the capability of the wireless communication device by one of:

receive, via the transceiver from the network, the plurality of power parameters and a plurality of geometric parameters determined based on mapping to the plurality of power parameters, wherein the plurality of geometric parameters is determined based at least in part on the location of the wireless communication device, wherein the plurality of power parameters comprises two or more of a power class, maximum output power level, or duty cycle; or determine the plurality of power parameters based on the location of the wireless communication device and a path of a base station of the network; and transmit, via the transceiver to the network, uplink data using the plurality of power parameters.

18. The wireless communication device of claim 17, wherein the at least one processor is configured to determine an elevation angle, a distance, or a sub-zone of cell for the wireless communication device based on the location of the wireless communication device and the path of the base station of the network.

19. The wireless communication device of claim 17, wherein the base station comprises a satellite; and the path of the base station comprises an ephemeris of the satellite.

20. The wireless communication device of claim 17, wherein the at least one processor is configured to receive, via the transceiver from the network, an indication of the applied power class and corresponding duty cycle for the wireless communication device.

* * * * *